(12) United States Patent
Jaffe

(10) Patent No.: US 11,516,623 B2
(45) Date of Patent: *Nov. 29, 2022

(54) DYNAMICALLY MAINTAINING WALKING PROFILE FOR TIME ESTIMATION

(71) Applicant: Uber Technologies, Inc., San Francisco, CA (US)

(72) Inventor: Howard David Jaffe, Pacifica, CA (US)

(73) Assignee: Uber Technologies, Inc, San Francisco, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/249,707

(22) Filed: Mar. 10, 2021

(65) Prior Publication Data

US 2021/0195372 A1    Jun. 24, 2021

Related U.S. Application Data

(63) Continuation of application No. 16/879,686, filed on May 20, 2020, now Pat. No. 10,972,869, which is a
(Continued)

(51) Int. Cl.
*H04W 4/02*      (2018.01)
*G06Q 10/06*    (2012.01)
(Continued)

(52) U.S. Cl.
CPC ............ *H04W 4/027* (2013.01); *G06Q 10/02* (2013.01); *G06Q 10/06311* (2013.01);
(Continued)

(58) Field of Classification Search
CPC . H04W 4/027; G06Q 10/02; G06Q 10/06311; G06Q 50/30; H04L 67/18
See application file for complete search history.

(56) References Cited

U.S. PATENT DOCUMENTS 10,126,138 B1   11/2018   Farmer et al.
10,127,795 B1   11/2018   Hwang et al.
(Continued)

FOREIGN PATENT DOCUMENTS

KR   20160018940 A   *   2/2016
KR   20160018940 A       2/2016

OTHER PUBLICATIONS

"U.S. Appl. No. 16/139,804, Non Final Office Action dated Sep. 20, 2019", 10 pgs.
(Continued)

*Primary Examiner* — Charles T Shedrick
(74) *Attorney, Agent, or Firm* — Schwegman Lundberg & Woessner, P.A.

(57) ABSTRACT

Systems and methods for dynamically maintaining and utilizing walking profiles for time estimations in service scheduling are provided. A networked system detects usage of an application on a user device. In response to the detecting, the networked system accesses environmental condition data at a location associated with a user of the user device, whereby the environmental condition data comprises one or more environmental condition affecting the location. The networked system accesses walking pace data from the user device, whereby the walking pace data represents a current walking pace of the user and correlates the walking pace data with the environmental condition data. Using the correlated data, the networked system adjusts a parameter in a walking profile of the user. The walking profile is then used to determine time estimates that are used to schedule services that require walking by a user.

18 Claims, 7 Drawing Sheets

Related U.S. Application Data continuation of application No. 16/139,804, filed on Sep. 24, 2018, now Pat. No. 10,701,518.

(51) Int. Cl.
   *G06Q 50/30* (2012.01)
   *H04W 4/021* (2018.01)
   *G06Q 10/02* (2012.01)
   *H04L 67/52* (2022.01)

(52) U.S. Cl.
   CPC ............ *G06Q 50/30* (2013.01); *H04L 67/52* (2022.05); *H04W 4/021* (2013.01)

(56) References Cited

U.S. PATENT DOCUMENTS

| | | | |
|---|---|---|---|
| 10,701,518 B2 | 6/2020 | Jaffe | |
| 2005/0184875 A1* | 8/2005 | Schmandt | H04L 67/18 340/573.1 |
| 2015/0223022 A1 | 8/2015 | Kumar et al. | |
| 2016/0358432 A1 | 12/2016 | Branscomb et al. | |
| 2016/0364678 A1 | 12/2016 | Cao | |
| 2018/0156623 A1* | 6/2018 | West | G01C 21/3423 |
| 2019/0017828 A1 | 1/2019 | Harish et al. | |
| 2019/0120640 A1 | 4/2019 | Ho et al. | |
| 2019/0206009 A1 | 7/2019 | Gibson et al. | |
| 2020/0100061 A1 | 3/2020 | Jaffe | |
| 2020/0288273 A1 | 9/2020 | Jaffe | |

OTHER PUBLICATIONS

"U.S. Appl. No. 16/139,804, Notice of Allowance dated Feb. 24, 2020", 5 pgs.

"U.S. Appl. No. 16/139,804, Response filed Dec. 20, 2019 to Non Final Office Action dated Sep. 20, 2019", 12 pgs.

"U.S. Appl. No. 16/879,686, Non Final Office Action dated Sep. 1, 2020", 8 pgs.

"U.S. Appl. No. 16/879,686, Notice of Allowance dated Dec. 10, 2020", 9 pgs.

"U.S. Appl. No. 16/879,686, Response filed Dec. 1, 2020 to Non Final Office Action dated Sep. 1, 2020", 11 pgs.

* cited by examiner

DYNAMICALLY MAINTAINING WALKING PROFILE FOR TIME ESTIMATION

CLAIM FOR PRIORITY

This application is a continuation of and claims the benefit of priority of U.S. application Ser. No. 16/879,686, filed May 20, 2020, which is a continuation of and claims the benefit of priority of U.S. application Ser. No. 16/139,804, filed Sep. 24, 2018, each of which is hereby incorporated by reference in their entireties.

TECHNICAL FIELD

The subject matter disclosed herein generally relates to special-purpose machines for maintaining profiles, and to the technologies by which such special-purpose machines become improved compared to other machines that maintain profiles. Specifically, the present disclosure addresses systems and methods to dynamically maintain a walking profile that is used for time estimation in schedule services.

BACKGROUND

Conventionally, when a user requests a service such as a pickup from a ride sharing service, a time estimation is calculated for arrival of a vehicle. However, the user's time to reach a pickup location is not taken into consideration. That may result in the rider arriving early to the pickup location and waiting, arriving late at the pickup location causing the vehicle and its occupant(s) to wait, or running to the pickup location to meet the vehicle.

In a delivery environment, a delivery driver is scheduled to pickup an item in a first window of time and deliver the item in a second time frame. If the delivery driver is a fast walker, the delivery driver may end up waiting for the item to be prepared for pickup. Alternatively, if the delivery driver is a slow walker, the estimated time of delivery may be incorrect and a delivery recipient may be left waiting for their item.

BRIEF DESCRIPTION OF THE DRAWINGS

Some embodiments are illustrated by way of example and not limitation in the figures of the accompanying drawings.

DETAILED DESCRIPTION

Figure 1:
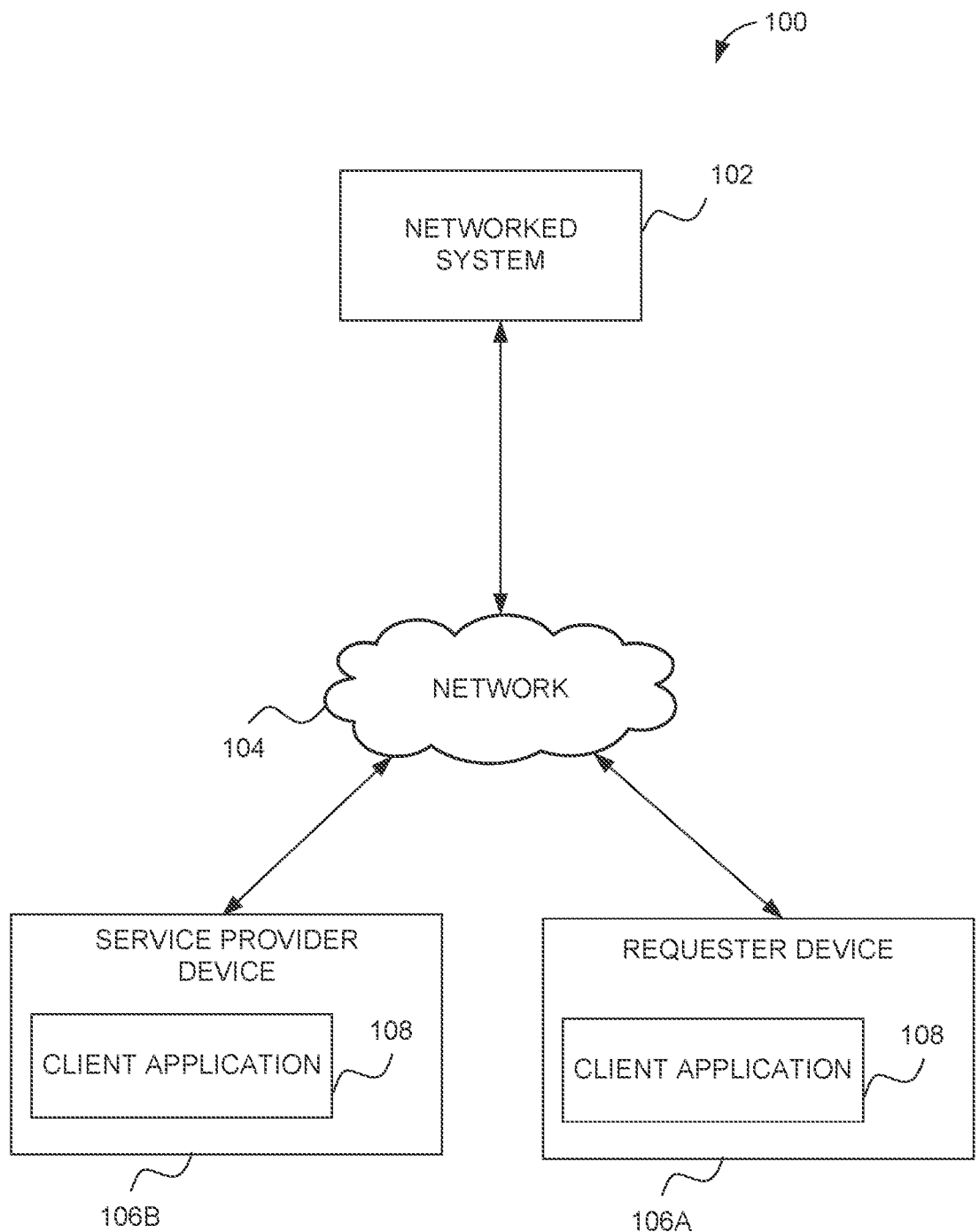
FIG. 1 is a diagram illustrating a network environment suitable for dynamically maintaining and utilizing walking profiles for time estimations used for scheduling services, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for dynamically maintaining and utilizing walking profiles for time estimations that are used for scheduling services. A networked system detects usage of an application on a user device. In response to the detecting, the networked system accesses environmental condition data at a location associated with a user of the user device, whereby the environmental condition data comprises one or more environmental condition affecting the location. The networked system accesses walking pace data from the user device, whereby the walking pace data represents a current walking pace of the user and correlates the walking pace data with the environmental condition data. Using the correlated data, the networked system adjusts a parameter in a walking profile of the user.

The walking profile is then used to determine time estimates that are used to schedule services that require walking by the user. In a ride share embodiment, the networked system receives a ride request from a user device of the user. In response, the networked system detects one or more environmental conditions at a current location associated with the user device. Using the detected one or more environmental conditions at the current location, a walking forecast for the user is determined. A geofence indicating a distance the user is expected to walk is generated in some embodiments and used to determine a pickup location for the user. Furthermore, a time estimate for when the user is expected to arrive at the pickup location is determined by the networked system. A notification regarding the pickup location and expected arrival time is presented to the user on their user device.

In a delivery service embodiment, the networked system receives a delivery request for delivery of an item. In response, the networked system detects one or more environmental conditions at pickup location of the item and a drop-off location. Using the detected one or more environmental conditions, a walking forecast for the user (e.g., service provider) is determined. A time estimate for the user to arrive at a pickup location and a time estimate for when the user will arrive at the drop-off location are determined based on the walking forecast. The time estimates are based on a distance the user needs to walk to reach the pickup location and drop-off location and the walking forecast. A notification is provided to the user that includes the time estimate for the user to arrive at the pickup location and the drop-off location.

Thus, example methods (e.g., algorithms) and example systems (e.g., special-purpose machines) are configured to improve a service provisioning process using dynamically maintained walking profiles of users. Therefore, one or more of the methodologies described herein facilitate solving the technical problem of efficiently scheduling services in a networked environment (e.g., ride sharing service, food or item delivery service).

FIG. 1 is a diagram illustrating a network environment 100 suitable for dynamically maintaining and utilizing walking profiles for time estimations used to schedule services, according to some example embodiments. The network environment 100 includes a networked system 102 communicatively coupled via a network 104 to a requester device 106a and a service provider device 106b (collectively referred to as "user devices 106"). In example embodiments, the networked system 102 comprises components that obtain, store, and analyze data received from the user devices 106 and other sources in order to dynamically maintain walking profiles of users (e.g., a requester or a service provider), and use the walking profile in real time to determine time estimates that are used for scheduling or timing a service. The components of the networked system 102 are described in more detail in connection with FIG. 2 to FIG. 4 and may be implemented in a computer system, as described below with respect to FIG. 8.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 interact with the networked system 102 through a client application 108 stored thereon. The client application 108 of the user devices 106 allow for exchange of information with the networked system 102 via user interfaces as well as in the background. For example, the client application 108 running on the user devices 106 may determine location information of the user devices 106 (e.g., latitude and longitude of a location of the user). Additionally, the client application 108 can access or determine a time between distances traveled which is used to determine a user's walking speed—also referred to as "walking pace" (e.g., a pedometer function). Further still, the client application 108, in some embodiments, accesses a gyrometer in the user device 106 to identify a steepness of terrain. The location information, walking pace data (e.g., detected time and distance; calculated walking speed), and gyrometer data are provided to the networked system 102, via the network 104, for storage and analysis.

In example embodiments, a user operates the requester device 106a that executes the client application 108 to communicate with the networked system 102 to make a request for transport or delivery service (referred to collectively as a "trip"). In some embodiments, the client application 108 determines or allows the user to specify a pickup location (e.g., of the user or an item to be delivered) and to specify a drop-off location for the trip. For example, the pickup location or the drop-off location may be an address or name of a point of interest (POI) inputted or selected by the user on a user interface provided via the client application 108. In some cases, the user may select a location for pickup that is a walking distance from their current location. In other cases, the user may be told to walk to a different location in order to be picked up. The client application 108 also presents information, from the networked system 102 via user interfaces, to the user of the requester device 106a.

A second user operates the service provider device 106b to execute the client application 108 that communicates with the networked system 102 to exchange information associated with providing transportation or delivery service (e.g., to the user of the requester device 106a). The client application 108 presents information via user interfaces to the user of the service provider device 106b, such as invitations to provide transportation or delivery service, navigation instructions, pickup and drop-off locations of people or items, and time estimates (e.g., arrival at pickup location and drop-off location). The client application 108 also provides a current location (e.g., coordinates such as latitude and longitude) of the service provider device 106b to the networked system 102.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100.

Furthermore, some components or functions of the network environment 100 may be combined or located elsewhere in the network environment 100. For example, some of the functions of the networked system 102 may be embodied within other systems or devices of the network environment 100. Additionally, some of the functions of the user device may be embodied within the network environment 100. While only a single networked system 102 is shown, alternative embodiments may contemplate having more than one networked systems 102 to perform server operations discussed herein for the networked system 102.

Figure 2:
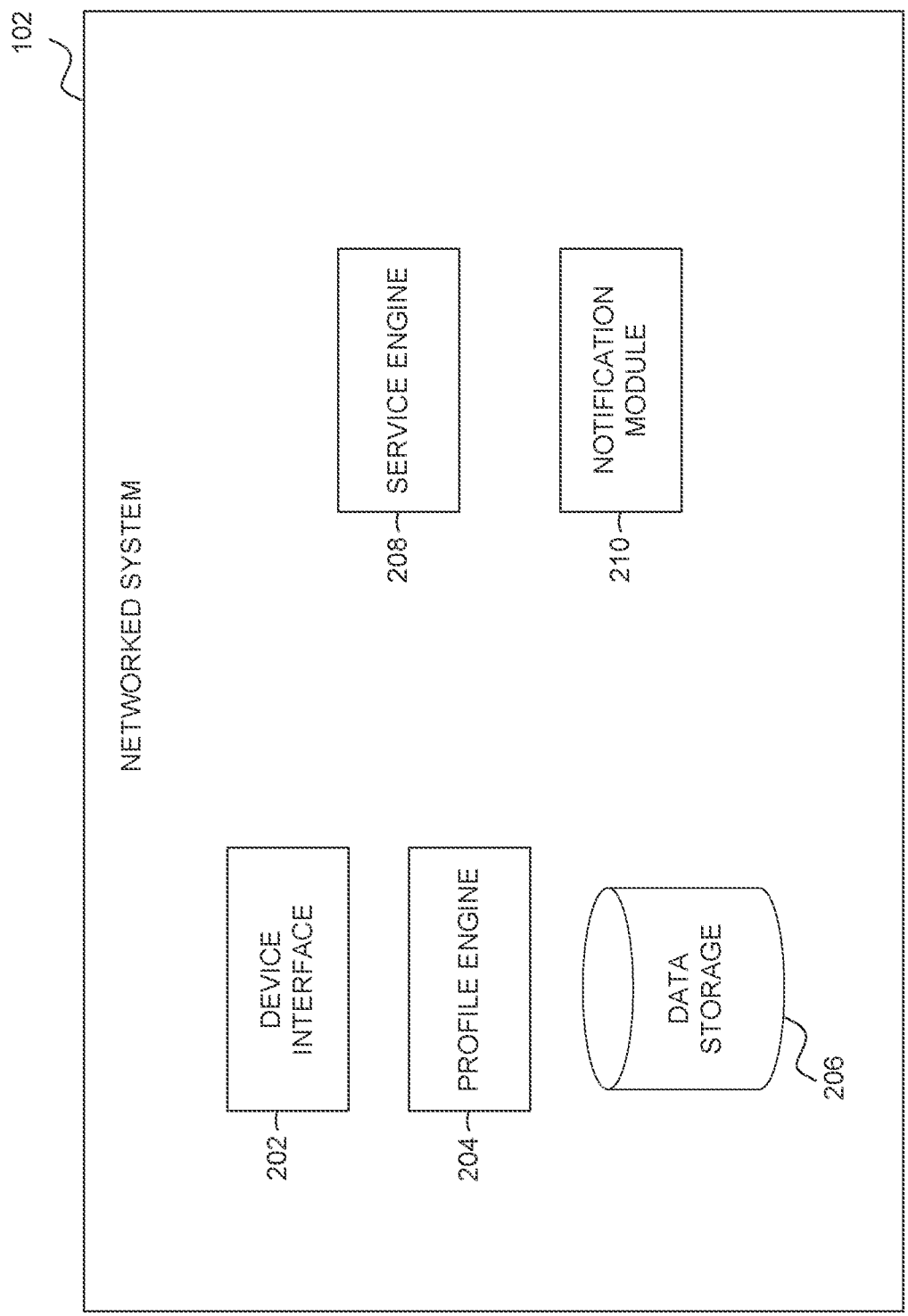
FIG. 2 is a block diagram illustrating components of a networked system, according to some example embodiments.

FIG. 2 is a block diagram illustrating components of the networked system 102, according to some example embodiments. In various embodiments, the networked system 102 obtains and stores walking pace data (e.g., time and distance; a calculated walking speed of the user) received from the user devices 106, analyzes the walking pace data to dynamically update a walking profile of the user, and uses one or more parameters of the walking profile to generate a time estimation. The time estimation is then used to schedule services such as a ride sharing service or a delivery service. To enable these operations, the networked system 102 comprises a device interface 202, a profile engine 204, a data storage 206, a service engine 208, and a notification module 210 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the user devices 106 and cause presentation of one or more user interfaces on the user devices 106. In example embodiments, the device interface 200 generates and transmits instructions (or the user interfaces themselves) to the user devices 106 to cause the user interfaces to be displayed on the user devices 106. The user interfaces can be used to request transport or delivery service from the requester device 106a, display invitations to provide the service on the service provider device 106b, present navigation instructions to the service provider device 106b, and preset time estimates (based on the user's walking profile) to arrive at a pickup location or drop-off location. The device interface 200 also receives information such as time and distance walked (or walking speed), location (e.g., latitude and longitude), as well as trip information from the user devices 106 (e.g., route taken, trip ratings). At least some of the information received from the user devices 106 are stored to the data storage 206.

The profile engine 204 manages a user profile at the networked system 102. A part of the user profile is a walking profile that is maintained and updated in real time. The walking profile is used by the networked system 102 to generate time estimates used to schedule services. The profile engine 204 will be discussed in more detail in connection with FIG. 3 below.

The data storage 206 is configured to store various data used by the networked system 102 to perform the time estimation. In example embodiments, the data is stored in or associated with a user profile corresponding to each user and includes the walking profile and associated data.

The service engine 208 manages scheduling of services using the walking profiles. Accordingly, the service engine 208 generates a time estimate, determines a walking area for a user (also referred to as a "walking geofence"), and schedules services such as matching a requester of a service with a service provider. The service engine 208 will be discussed in more detail in connection with FIG. 4 below.

The notification module 210 generates notifications based on scheduled services from the service engine 208. The notifications are then provided (e.g., transmitted, caused to be displayed) by the device interface 202 to the user device 106. In example embodiments, the notification comprises, for example, an indication to the requester device 106a for the user to walk to a pickup location within a walking geofence that is determined based on their walking profile; an indication to the service provider device 106b when to arrive at a pickup location to pick up an item; a notice to the requester device asking if the user needs to adjust their pickup location or time because the user is further away from a pickup location than their walking profile suggests they can reasonable walk; or a notice to the requester device offering to rebook the user with a different service provider because the user is further away from a pickup location than their walking profile suggests they can reasonable walk. The notification module 210 can provide other notifications as well.

Figure 3:
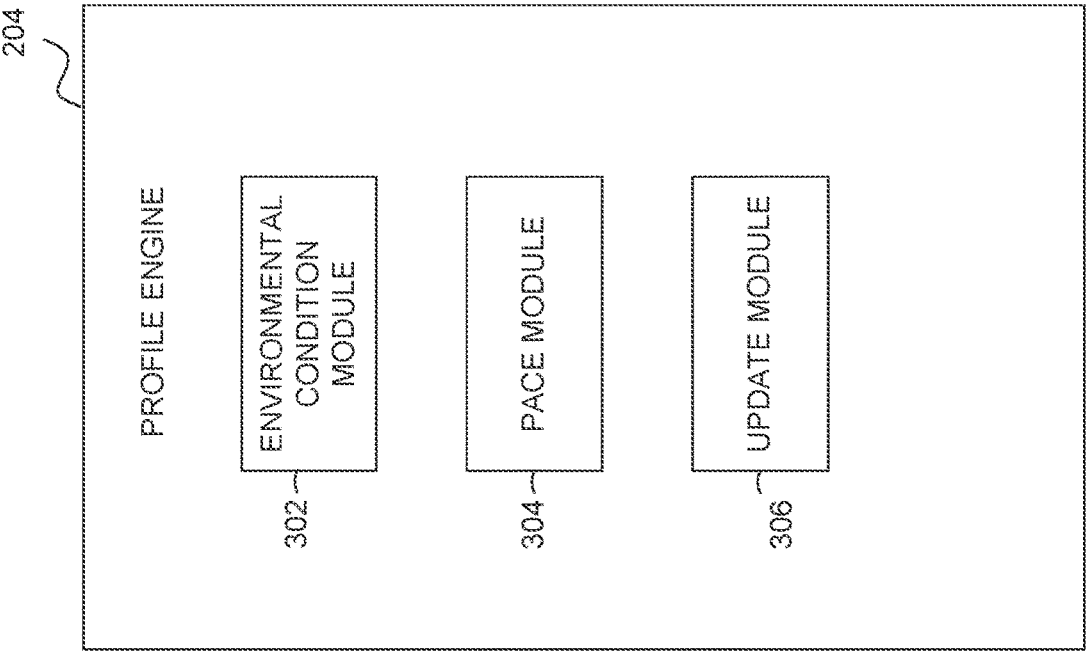
FIG. 3 is a block diagram illustrating components of a profile engine, according to some example embodiments.

FIG. 3 is a block diagram illustrating components of the profile engine 204, according to some example embodiments. In various embodiments, the profile engine 204 obtains and stores walking pace data from the user devices 106, analyzes the walking pace data to dynamically update a walking profile of the user, and uses one or more parameters of the walking profile to generate a time estimation (or time estimate). To enable these operations, the profile engine 204 comprises an environmental condition module 302, a pace module 304, and an update module 306 all configured to communicate with each other (e.g., via a bus, shared memory, or a switch). The profile engine 204 may also comprise other components (not shown) that are not pertinent to example embodiments. Furthermore, any one or more of the components described herein may be implemented using hardware (e.g., a processor of a machine) or a combination of hardware and software. Moreover, any two or more of these components may be combined into a single component, and the functions described herein for a single component may be subdivided among multiple components.

The environmental condition module 302 is configured to access environmental conditions for a location associated with a user. In example embodiments, when the client application 108 is activated or otherwise in use, the environmental condition module 302 determines environmental conditions at the location of the user. The environmental conditions indicate one or more of temperature, ice condition, snow condition (e.g., light, moderate, heavy), rain condition (e.g., light, moderate, heavy), incline condition (e.g., moderate, steep), decline condition (e.g., moderate, steep), or other particular geographies. In some cases, the environmental condition module 302 receives incline and decline conditions from a gyrometer of the user device 106. In these cases, when the client application 108 is activated or otherwise in use, the environmental condition module 302 pulses or otherwise accesses the gyrometer in the user device 106. In some cases, the environmental condition module 302 receives weather conditions (e.g., ice, snow, rain, temperature) from an online source via the network 104, from the user devices 106, or from the networked system's own weather and environmental information that is curated and stored in the data storage 206. In some cases, more than one environmental condition may occur at the same location. For example, the temperature may be cold, there is ice, and there is a steep incline. This results in a compound environmental condition.

The pace module 304 is configured to determine a walking pace for a user and associate the walking pace with one or more environmental conditions. In example embodiments, the pace module 304 accesses (e.g., receives, retrieves) the walking pace data (e.g., time and distance; walking speed) for the user and accesses the environmental condition(s) for the location of the user as determined by the environmental condition module 302. In example embodiments, when the client application 108 is activated or otherwise in use, the pace module 304 pulses or otherwise accesses a pedometer or similar time/distance tracking application/component in the user device 106. In embodiments where the pace module 304 cannot access walking speed from a pedometer component, the pace module 304 accesses walking time and distance data. The pace module 304 divides the distance by the time to determine the walking pace for the user. The pace module 304 correlates the walking pace (from the pedometer or its own calculation) with the environmental condition(s). In cases where more than one environmental condition occurs at the location, the walking pace is correlated with a compound environmental condition. For example, if it is cold with ice and a steep incline, the compound environmental condition is "cold, ice, steep incline." Any combination of two or more environmental conditions can be combined to derive the compound environmental condition.

In example embodiments, the pace module 304 works with the update module 306 to determine averages and revise walking paces associated with each environmental condition. As such, the pace module 304 accesses the walking profile of a user and applies new walking pace data, in real time, to a stored value corresponding to the same environmental condition(s). The application of the new walking pace data may cause the stored value to be adjusted up or down or not changed at all. For example, if the user is walking in a baseline situation (e.g., no extenuating/pace influencing factors associated with environmental conditions), then a new baseline is recorded and used to update the 30, 60, and 90 day averages (or other day range average). If the user is walking in a specific environmental condition such as light snow where a previous baseline differential was −0.2 M/S but now the user is walking at −0.17 M/S, then the update module 306 updates the profile with new data calculated by taking a mathematical average of the previous recorded differentials for those conditions. If there are more than ten data points, then the update module 306 looks at the average of the last five data points in accordance with one embodiment. The reason for only looking at the latest five data points is that, after many sessions, the average may not show key differences despite a user's change in ability over time.

The update module 306 updates parameters of the walking profile of the user with the new walking pace determined by the pace module 304. In example embodiments, the update module 306 accesses the user's walking profile (e.g., from a user profile stored at the storage device 206) and adjusts values of one or more attributes. In one embodiment, the attributes comprise a traditional baseline, a networked system baseline, averages, and a plurality of environmental conditions. The values include walking paces for a traditional baseline, a networked system baseline, and averages. The walking profile also includes differentials (e.g., differences from the networked system baseline) for each environmental condition and compound environmental condition encountered by the user. Accordingly, each user may have a different set of attributes since each user faces different environmental conditions. As an example, a walking profile for a particular user may be the following:

| | |
|---|---|
| Traditional Baseline | 1.6 M/S |
| Networked System Baseline | 1.4 M/S |
| 30 Day Average | 1.4 M/S |
| 90 Day Average | 1.3 M/S |
| 180 Day Average | 1.2 M/S |
| Hot (X Degrees Above Ave.) | −.2 M/S |
| Cold (X Degrees Below Ave.) | −.2 M/S |
| Ice | −.4 M/S |
| Light Snow | −.2 M/S |
| Moderate Snow | −.6 M/S |
| Heavy Snow | −.9 M/S |
| Light Rain | −.2 M/S |
| Moderate Rain | −.4 M/S |
| Heavy Rain | −.6 M/S |
| Moderate Incline | −.3 M/S |
| Steep Incline | −.6 M/S |
| Moderate Decline | +.3 M/S |
| Steep Decline | +.6 M/S |
| City X | −.3 M/S |
| Neighborhood Y | −.4 M/S |
| Cold, Ice, Steep Incline | −.2 M/S |
| Cold, Light Snow | −.1 M/S |

In example embodiments, the values in the walking profile are initially populated with defaults which may be influenced by the user's personal attributes, if known, from the user profile (e.g., height, weight, gender) or regional norms in walking speed (e.g., some regions walk slower than others). The traditional baseline is a user baseline walking pace calculated using a built-in application or pedometer application of the user devices 106. In one embodiment, traditional baseline comprises an average walking pace for the region. The networked system baseline is the walking pace for the user considering environmental conditions. The remainder of the attributes incorporate environmental factors, thus learning a user's walking pace under specific environmental conditions.

The update module 306 overwrites the defaults with the user's actual walking pace information (e.g., for network system baseline and averages) and computational average differentials for how the user's walking pace changes based on one or more environmental conditions as calculated by the pace module 304. For example, the update module 306 incorporates the new walking pace data with a stored value corresponding to the same environmental condition(s) in the walking profile and determines a new average for the value. Additionally, in some cities or neighborhoods, a change in walking pace is detected because of familiarity or lack of familiarity or other reasons. For these cities or neighborhoods, a computational average differential is also stored in the walking profile (e.g., City X is −0.3 M/S; Neighborhood Y is −0.4 M/S). While averages over the last 30, 90, and 180 days are used in the example walking profile above, any timespan may be used in determining an average. Additionally, some embodiments may use seasonal averages (e.g., average for winter).

Figure 4:
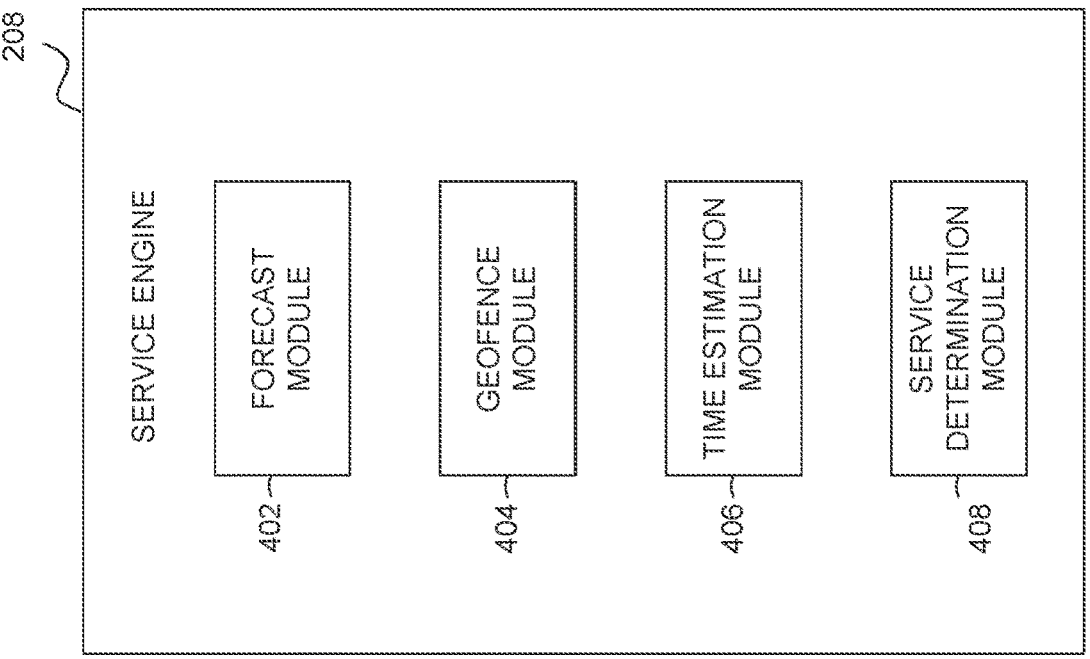
FIG. 4 is a block diagram illustrating components of a service engine, according to some example embodiments.

FIG. 4 is a block diagram illustrating components of the service engine 208, according to some example embodiments. In various embodiments, the service engine 208 manages scheduling of services using the walking profiles. To enable these operations, the service engine 208 comprises a forecast module 402, a geofence module 404, a time estimation module 406, and a service determination module 408 all configured to communicate with each other (e.g., via a bus, shared memory, or a switch). The service engine 208 may also comprise other components (not shown) that are not pertinent to example embodiments. Furthermore, any one or more of the components described herein may be implemented using hardware (e.g., a processor of a machine) or a combination of hardware and software. Moreover, any two or more of these components may be combined into a single component, and the functions described herein for a single component may be subdivided among multiple components.

The forecast module 402 determines a user's walking pace in their present environment when a service is requested where the user is a requester, or determines a user's walking pace in an environment where the user will be performing services when the user is a service provider that is providing delivery service. The forecast module 402 accesses the environmental condition(s) for the location associated with a user that was detected by the environmental condition module 302, and uses the environmental condition(s) to determine which parameter(s) (e.g., attribute/ value combination) from the walking profile to use. In example embodiments, the forecast module 402 combines the networked system baseline with (e.g., adds or subtracts) the corresponding value (e.g., differential) for the environmental condition(s) in which the user will be walking. For incline/decline consideration, the forecast module 402 can access a database of locations that have stored topology information to determine whether the area in which the user is walking has inclines or declines. For example, if the networked system baseline is 1.4 M/S but there is light snow in the area, the forecast module 402 combines the differential from a light snow condition (e.g., −0.2 M/S) with the networked system baseline resulting in a forecast walking pace (also referred to herein as "walking forecast") of 1.2 M/S.

The geofence module 404 determines a geofence that the user is expected to be willing to walk in a specific timeframe. Using the forecast walking pace generated by the forecast module 402, the geofence module 404 determines a distance associated with a location of the user based on the forecast walking pace. The geofence may be increased or decreased from a default geofence based on the forecast walking pace. Thus, for example, if the user has a fast walking pace (e.g., above the value for the traditional baseline), the geofence is made bigger, and vice-versa. The geofence is used by the service determination module 408, as will be discussed in more detail below, to determine a service provider for the user.

The time estimation module 406 determines time estimates for a user based on their walking profile. For example, if the user is a requester of a ride service, the time estimation module 406 determines a time estimate for when the user will reach a pickup location or final destination (from a drop-off location) based on their forecast walking pace. In a delivery service embodiment, the time estimation module 406 determines an estimated walking time for a user (e.g., delivery driver) as part of a pickup time for an item and/or delivery time to a recipient.

The service determination module 408 manages service requests and matching service providers with requesters. In a ride sharing embodiment, the service determination module 408 determines one or more possible service providers based on the user's forecast walking pace and geofence. For example, based on the user's forecast walking pace, there are some service providers (e.g., vehicles in the ride share service) that will require a walking ability beyond the comfort or capability of the user or outside the geofence. In some cases, these service providers are removed from consideration when determining a set of one or more potential service providers. In other cases, a selected service provider may be guided to a closer pickup location to the user.

In some embodiments, the service determination module 408 works with the notification module 210 to provide updates to the users. For example, if a user is further away from a pickup location than their forecast walking pace suggests they can reasonable walk to, the service determination module 408 instructs the notification module 210 to ask the user if they need to adjust their pickup location or time. Alternatively, the notification module 210 provides an offer to book the user for a pickup at a different time or pickup location.

Figure 5:
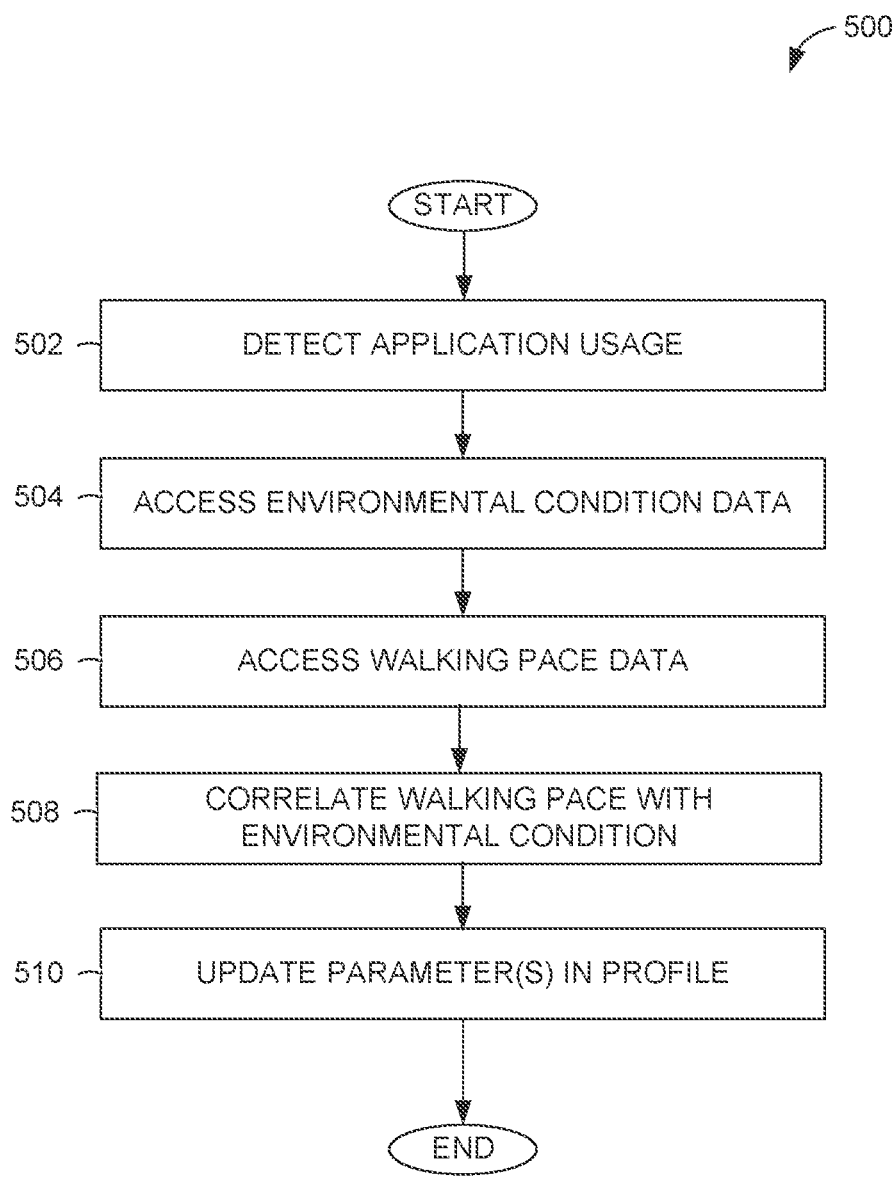
FIG. 5 is a flowchart illustrating operations of a method for maintaining a walking profile, according to some example embodiments.

FIG. 5 is a flowchart illustrating operations of a method 500 for maintaining a walking profile, according to some example embodiments. Operations in the method 500 may be performed by the profile engine 204 of the networked system 102, using components described above with respect to FIG. 3. Accordingly, the method 500 is described by way of example with reference to the profile engine 204. However, it shall be appreciated that at least some of the operations of the method 500 may be deployed on various other hardware configurations or be performed by similar components residing elsewhere in the network environment 100. Therefore, the method 500 is not intended to be limited to the profile engine 204.

In operation 502, the networked system 102 detects that the client application 108 is in use. For example, when the user launches or otherwise uses the client application 108, the networked system 102 receives an indication of use of the client application. The indication triggers the networked system 102 to, in some embodiments, determine a real time walking pace of the user that is used to update the walking profile.

In operation 504, the environmental condition data is accessed. In example embodiments, when the indication is received in operation 502, the environmental condition module 302 determines environmental conditions at a location of the user. The environmental conditions indicate one or more of temperature, ice condition, snow condition (e.g., light, moderate, heavy), rain condition (e.g., light, moderate, heavy), incline condition (e.g., moderate, steep), decline condition (e.g., moderate, steep), or other particular geographies. In some cases, the environmental condition module 302 receives incline and decline conditions from a gyrometer of the user device 106. In some cases, the environmental condition module 302 receives weather conditions (e.g., ice, snow, rain, temperature) from an online source, from the user devices 106, or from the networked system's own curated weather and environmental information. In some cases, more than one environmental condition occurs at the same location resulting in a compound environmental condition.

In operation 506, walking pace data is accessed. In example embodiments, the pace module 304 accesses (e.g., receives, retrieves) the walking pace data (e.g., time and distance; walking speed) for the user. For example, when the indication is received in operation 502, the pace module 304 pulses or otherwise accesses a pedometer or similar time/ distance tracking application/component in the user device 106 to obtain the walking pace. In embodiments where the pace module 304 cannot access walking speed from a pedometer component, the pace module 304 accesses walking time and distance data. The pace module 304 divides the distance by the time to determine the walking pace for the user.

In operation 508, the walking pace is correlated with the environmental condition(s). In example embodiments, the pace module 304 accesses (e.g., receives, retrieves) the environmental condition(s) for the location of the user as determined by the environmental condition module 302 in operation 504. The pace module 304 correlates the walking pace (from the pedometer or its own calculation) with the environmental condition(s). In cases where more than one environmental condition occurs at the location, the walking pace is correlated with a compound environmental condition that combines all the environmental conditions. Any combination of two or more environmental conditions can be combined to derive the compound environmental condition.

In operation 510, the parameters in the walking profile are dynamically updated. In example embodiments, the pace module 304 works with the update module 306 to determine averages and revise walking paces associated with each environmental condition. For example, the pace module 304 accesses the walking profile of a user and applies new walking pace data determined in operations 506 and 508 to a stored value corresponding to the same environmental condition(s). The application of the new walking pace data may cause the stored value to be adjusted up or down or not changed at all. The update module 306 overwrites the defaults or current values with the user's actual walking pace information (e.g., for network system baseline and averages) and computational average differentials for how the user's walking pace changes based on one or more environmental conditions as calculated by the pace module 304. Additionally, the pace module 304 and update module 360 may adjust walking pace for a city or neighborhood based on a user's familiarity or lack of familiarity or other reasons (e.g., a user walks faster in their own neighborhood; a user walks slower in a city he is visiting).

Figure 6:
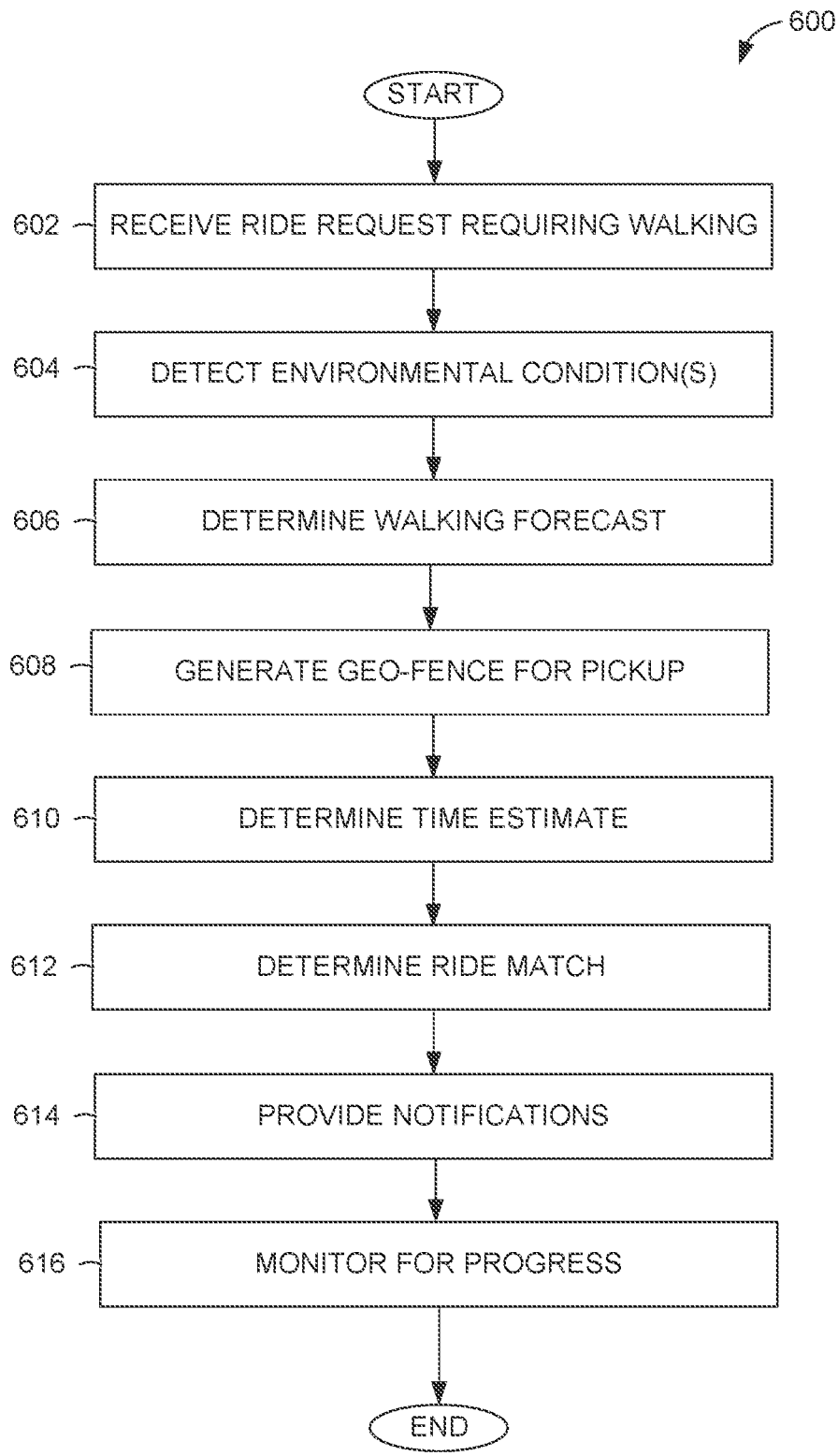
FIG. 6 is a flowchart illustrating operations of a method for managing a ride request using the walking profile, according to some example embodiments.

FIG. 6 is a flowchart illustrating operations of a method 600 for managing a ride request using the walking profile, according to some example embodiments. Operations in the method may be performed by the networked system 102 including the service engine 208, using components described above with respect to FIG. 2 and FIG. 4. Accordingly, the method 600 is described by way of example with reference to the networked system 102. However, it shall be appreciated that at least some of the operations of the method 600 may be deployed on various other hardware configurations or be performed by similar components residing elsewhere in the network environment 100. Therefore, the method 600 is not intended to be limited to the networked system 102.

In operation 602, the networked system 102 receives a ride request from a requester device 106a of a user. In example embodiments, the ride request indicates a pickup and drop-off location.

In operation 604, environmental condition(s) are detected at the user's location or area. In example embodiments, the forecast module 402 accesses the environmental condition(s) for the location associated with a user that were detected by the environmental condition module 302. Since the profile engine 204 monitors in real time a walking speed and environmental conditions associated with a location of the user, the forecast module 402 can use the same environmental condition(s) to determine which parameter(s) (e.g., attribute/value combination) from the walking profile to use.

In operation 606, a walking forecast is determined by the forecast module 402. In example embodiments, the forecast module 402 accesses the walking profile of the user. The forecast module 402 takes the networked system baseline and combines the corresponding value (e.g., differential) for the environmental condition(s) detected in operation 604 in which the user will be walking. For incline/decline consideration, the forecast module 402 can access a database of locations that have stored topology information to determine whether the area in which the user is walking has inclines or declines. For example, if the networked system baseline is 1.4 M/S but there is light snow in the area, the forecast module 402 combines the differential from a light snow condition (e.g., −0.2 M/S) with the networked system baseline resulting in a forecast walking pace of 1.2 M/S.

In operation 608, a geo-fence is generated for the user. In example embodiments, the geofence module 404 determines a geofence that the user is expected to be willing to walk in a specific timeframe in order to arrive at a pickup location somewhat concurrently with arrival of the service provider. Using the walking forecast generated in operation 606, the geofence module 404 determines a distance from a current location of the user based on the forecast walking pace. The geofence may be increased or decreased from a default geofence based on the forecast walking pace. Thus, for example, if the user has a fast walking pace (e.g., above the value for the traditional baseline), the geofence is made bigger, or vice-versa.

In operation 610, a time estimate is determined for the user. The time estimation module 406 determines time estimates for the user to arrive at a pickup location or a destination (from their drop-off location) based on their walking profile. The time estimate considers how far the user needs to walk to reach their pickup location or destination and applies the forecast walking pace to derive the time estimate.

In operation 612, a ride match is determined. In example embodiments, the service determination module 408 manages ride requests which matches one or more service providers with the user. The service determination module 408 determines one or more possible service providers based on the user's forecast walking pace. For example, based on the user's forecast walking pace, there are some service providers (e.g., vehicles in the ride share service) that will require a walking ability beyond the comfort or capability of the user (and outside of the geofence). These service providers are removed from consideration when determining a set of one or more potential service providers. In embodiments where more than one potential service provider is identified, the potential service providers are notified of the ride request and a potential service provider that responses first is matched (e.g., selected) for the ride request.

In operation 614, notifications are provided to the user at the requester device 106a and to the service provider at the service provider device 106b regarding the ride request match. The notifications can include directions and the time estimate for the user to arrive at a pickup location as well as directions and time estimate for the service provider to arrive at the pickup location.

In operation 616, the networked system 102 monitors for progress of the user. In example embodiments, the service determination module 408 monitors the pace of the user when walking to the pickup location. If the user is further away from a pickup location than their forecast walking pace suggests they can reasonable walk to, the service determination module 408 instructs the notification module 210 to ask the user if they need to adjust their pickup location or time. Alternatively, the notification module 210 provides an offer to book the user for a pickup at a different time or pickup location.

Figure 7:
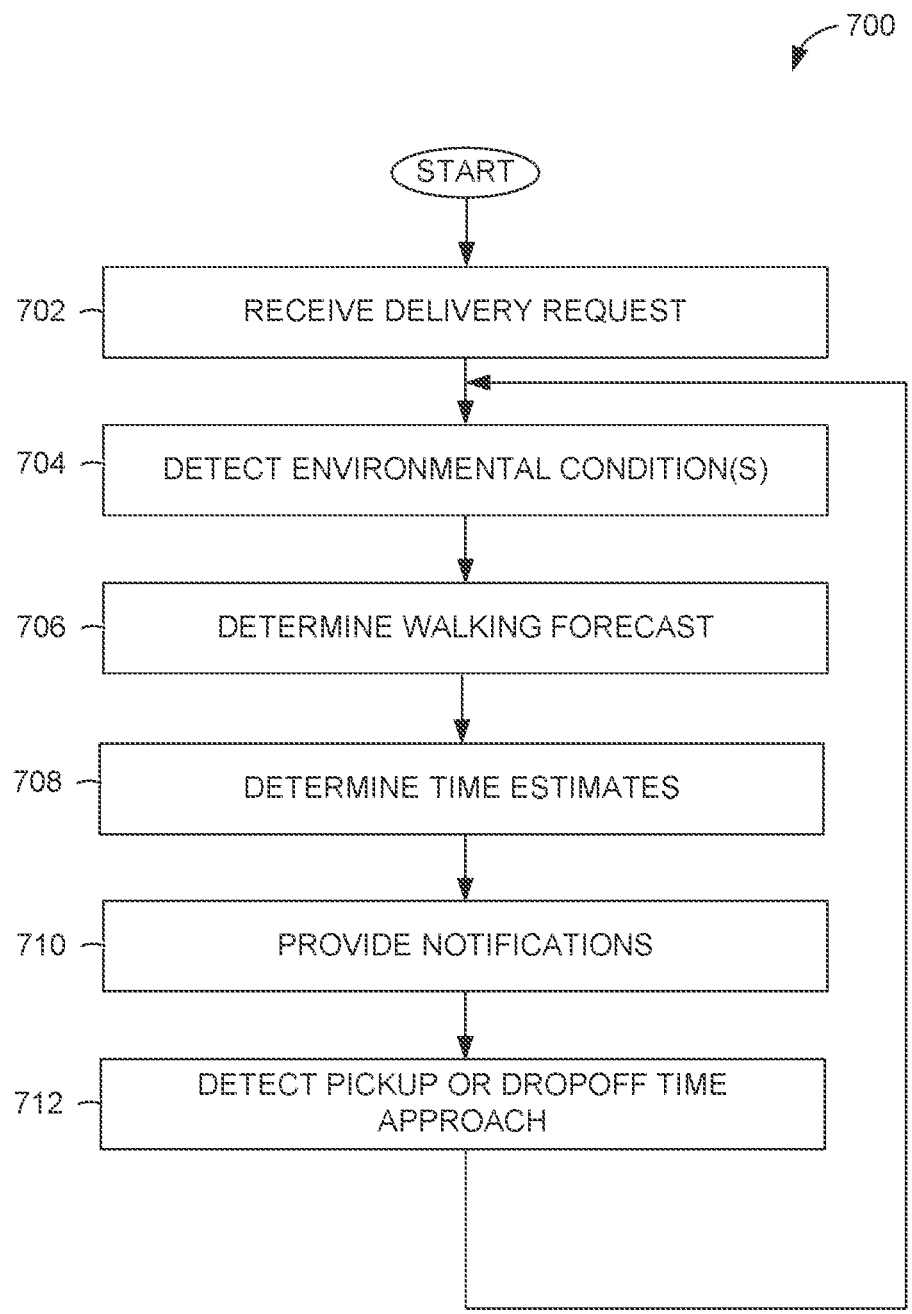
FIG. 7 is a flowchart illustrating operations of a method for managing a delivery request service using the walking profile, according to some example embodiments.

FIG. 7 is a flowchart illustrating operations of a method 700 for managing a delivery request service using the walking profile, according to some example embodiments. Operations in the method may be performed by the networked system 102 including the service engine 208, using components described above with respect to FIG. 2 and FIG. 4. Accordingly, the method 700 is described by way of example with reference to the networked system 102. However, it shall be appreciated that at least some of the operations of the method 700 may be deployed on various other hardware configurations or be performed by similar components residing elsewhere in the network environment 100. Therefore, the method 700 is not intended to be limited to the networked system 102.

In operation 702, the networked system 102 receives a delivery request from a requester device 106a of a user. In example embodiments, the delivery request is for a service provider to pickup and deliver an item. The item may be a food order to be picked up from a restaurant and delivered to the user of the requester device 106a. Alternatively, the item may be a package that the user would like delivered.

In operation 704, environmental condition(s) are detected at the pickup location and in some cases, the drop-off (delivery) location. In example embodiments, the forecast module 402 accesses the environmental condition(s) for the pickup location (and possibly the drop-off location) that were detected by the environmental condition module 302.

In operation 706, a walking forecast is determined by the forecast module 402 for the service provider. Typically, the service provider will need to park their vehicle and walk to the pickup location, as well as park their vehicle and walk to the drop-off location. In example embodiments, the forecast module 402 accesses the walking profile of the service provider. The forecast module 402 combines the networked system baseline with the corresponding value (e.g., differential) for the environmental condition(s) detected in operation 704 in which the service provider will be walking. The result is the walking forecast for the pickup location and the drop-off location.

In operation 708, a time estimate is determined for the service provider. The time estimation module 406 determines time estimates for the service provider to arrive at a pickup location or a drop-off location from their parked vehicle based on their walking profile. The time estimate considers how far the service provider needs to walk to reach their pickup location (e.g., restaurant) or drop-off location, and applies the forecast walking pace to derive the time estimate.

In operation 710, a notification is provided to the service provider at the service provider device 106b. The notification can include directions and the time estimate for the service provider to arrive at a pickup location (e.g., walk to the pickup location from their parked vehicle) as well as directions and time estimate for the service provider to arrive at the drop-off location (e.g., walk to the drop-off location from their parked vehicle). In some embodiments, a notification is provided to the requester at the requester device 106a indicating an estimated time the service provider will be delivering their item.

In operation 712, the networked system 102 detects that a pickup time is approaching or that a drop-off time is approaching. For example, the networked system 102 detects that the pickup time is five minutes away. Based on the detection, the networked system 102 returns to operation 704 to update, if necessary, the time estimates. For example, the original determination of the time estimate was based on an environmental condition that it is cold. However, the updated determination of the time estimate is based on an environmental condition that it is cold with light snow.

Operation 712 may be optional in some embodiments. For example, if the item to be picked up is ready when the delivery request is made, operation 712 is not necessary. Operation 712 is useful when, for example, the delivery request is for a food delivery. A first iteration through the method 700 is performed when the delivery request is received. However, the food needs to be prepared by the restaurant. The user is notified with an initial time estimate to pick up the food based on their walking forecast (e.g., to walk from their parked car to the restaurant). In some cases, the time estimate may also include a time the user should drive to the restaurant in order pick up the food when it is ready. As the time approaches for the pickup, a second iteration of the method 700 is performed to revise the time estimate in case one or more environmental conditions have changed.

Figure 8:
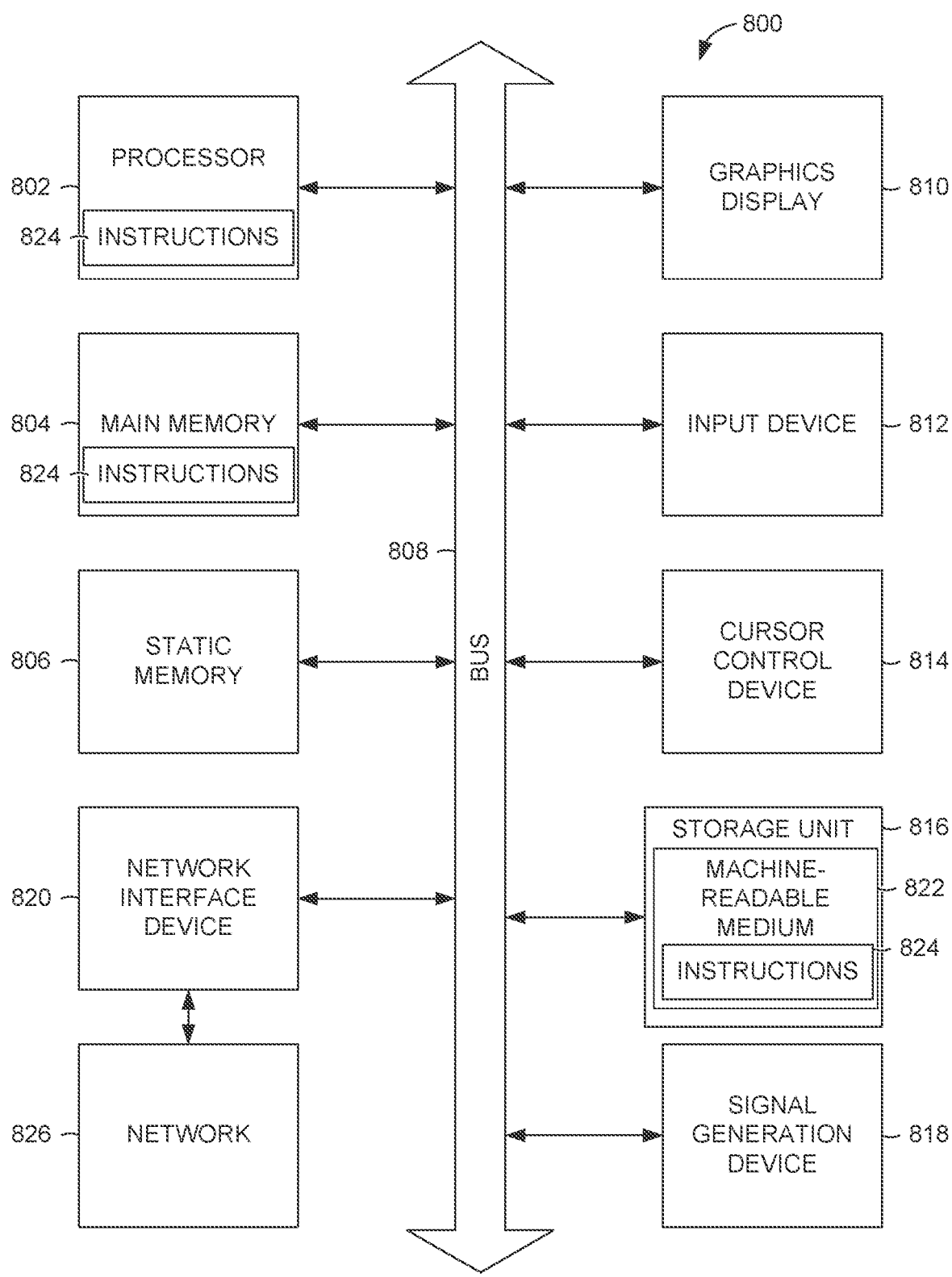
FIG. 8 is a block diagram illustrating components of a machine, according to some example embodiments, able to read instructions from a machine-readable medium and perform any one or more of the methodologies discussed herein.

FIG. 8 illustrates components of a machine 800, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIGS. 5-7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-readable medium 822 (e.g., a tangible machine-readable storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-readable media (e.g., tangible and non-transitory machine-readable media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for dynamically maintaining and utilizing walking profiles for time estimations in service scheduling. The method comprising detecting, by a networked system, usage of an application on a user device; in response to the detecting, accessing, by the networked system, environmental condition data at a location associated with a user of the user device, the environmental condition data comprising one or more environmental condition affecting the location; accessing, by the networked system, walking pace data from the user device, the walking pace data representing a current walking pace of the user; correlating, by the networked system, the walking pace data with the environmental condition data; and using the correlated data, adjusting, by the networked system, a parameter in a walking profile of the user stored in a data storage.

In example 2, the subject matter of example 1 can optionally include wherein the accessing the walking pace data comprises pulsing a pedometer or time/distance component at the user device to obtain the walking pace data.

In example 3, the subject matter of examples 1-2 can optionally include wherein the correlating comprises correlating the walking pace data with a compound environmental condition, the compound environmental condition comprising an attribute that combines all environmental conditions detected from the environmental condition data.

In example 4, the subject matter of examples 1-3 can optionally include wherein the accessing the environmental condition data comprises accessing incline or decline conditions from a gyrometer of the user device.

In example 5, the subject matter of examples 1-4 can optionally include receiving a ride request from the user device; in response to receiving the ride request, detecting one or more environmental conditions at a current location associated with the user device; and using the detected one or more environmental conditions at the current location, determining a walking forecast for the user.

In example 6, the subject matter of examples 1-5 can optionally include wherein the determining the walking forecast comprises accessing the walking profile of the user, the walking profile including a networked system baseline and differentials corresponding to each environmental condition or compound environmental condition; determining a differential that correlates to the detected one or more environmental conditions at the current location; and applying the differential to the networked system baseline to derive the walking forecast.

In example 7, the subject matter of examples 1-6 can optionally include generating a geo-fence based on the walking forecast, the geo-fence indicating a distance the user is expected to walk in a specific timeframe to reach a pickup location.

In example 8, the subject matter of examples 1-7 can optionally include determining a time estimate for the user to arrive at a pickup location, the determining the time estimate comprising detecting a distance the user needs to walk to reach the pickup location and applying the walking forecast.

In example 9, the subject matter of examples 1-8 can optionally include determining a service provider to respond to the ride request, the determining comprising selecting the service provider from a set of one or more service providers based on the walking forecast In example 10, the subject matter of examples 1-9 can optionally include monitoring a pace of the user walking to a pickup location; detecting that the user is further away from the pickup location than their walking forecast suggests they can reasonable walk to; and causing presentation of a notification to the user inquiring whether the user needs to adjust their pickup location or time or offering to book the user a different pickup location or time In example 11, the subject matter of examples 1-10 can optionally include receiving a delivery request for delivery of an item; in response to receiving the delivery request, detecting one or more environmental conditions at pickup location of the item and a drop-off location; using the detected one or more environmental conditions at the pickup location and drop-off location, determining a walking forecast for the user at each location, the user being a service provider that will deliver the item; determining a time estimate for the user to arrive at a pickup location and the drop-off location, the determining the time estimate comprising detecting a distance the user needs to walk to reach the pickup location and drop-off location and applying the walking forecast corresponding to each location; and causing presentation of a notification to the user that includes the time estimate for the user to arrive at the pickup location and the time estimate to arrive at the drop-off location.

In example 12, the subject matter of examples 1-11 can optionally include detecting that a time for pickup of the item or drop-off of the item is approaching; in response to the detecting that the time is approaching, repeating the detecting one or more environmental conditions at the pickup location or the drop-off location, the determining the walking forecast for the user, and the determining the time estimate for the user to arrive at the pickup location or drop-off location; and based on a determination that the time estimate has changed, causing presentation of a second notification to the user that includes a revised time estimate for the user to arrive at the pickup location or drop-off location.

Example 13 is a system for dynamically maintaining and utilizing walking profiles for time estimations in service scheduling. The system includes one or more processors and a storage device storing instructions that, when executed by the one or more hardware processors, causes the one or more hardware processors to perform operations comprising detecting usage of an application on a user device; in response to the detecting, accessing environmental condition data at a location associated with a user of the user device, the environmental condition data comprising one or more environmental condition affecting the location; accessing walking pace data from the user device, the walking pace data representing a current walking pace of the user; correlating the walking pace data with the environmental condition data; and using the correlated data, adjusting a parameter in a walking profile of the user stored in a data storage.

In example 14, the subject matter of example 13 can optionally include wherein the correlating comprises correlating the walking pace data with a compound environmental condition, the compound environmental condition comprising an attribute that combines all environmental conditions detected from the environmental condition data.

In example 15, the subject matter of examples 13-14 can optionally include receiving a ride request from the user device; in response to receiving the ride request, detecting one or more environmental conditions at a current location associated with the user device; and using the detected one or more environmental conditions at the current location, determining a walking forecast for the user.

In example 16, the subject matter of examples 13-15 can optionally include wherein the determining the walking forecast comprises accessing the walking profile of the user, the walking profile including a networked system baseline and differentials corresponding to each environmental condition or compound environmental condition; determining a differential that correlates to the detected one or more environmental conditions at the current location; and applying the differential to the networked system baseline to derive the walking forecast.

In example 17, the subject matter of examples 13-16 can optionally include determining a time estimate for the user to arrive at a pickup location, the determining the time estimate comprising detecting a distance the user needs to walk to reach the pickup location and applying the walking forecast.

In example 18, the subject matter of examples 13-17 can optionally include monitoring a pace of the user walking to a pickup location; detecting that the user is further away from the pickup location than their walking forecast suggests they can reasonable walk to; and causing presentation of a notification to the user inquiring whether the user needs to adjust their pickup location or time or offering to book the user a different pickup location or time.

In example 19, the subject matter of examples 13-18 can optionally include receiving a delivery request for delivery of an item; in response to receiving the delivery request, detecting one or more environmental conditions at pickup location of the item and a drop-off location; using the detected one or more environmental conditions at the pickup location and drop-off location, determining a walking forecast for the user at each location, the user being a service provider that will deliver the item; determining a time estimate for the user to arrive at a pickup location and the drop-off location, the determining the time estimate comprising detecting a distance the user needs to walk to reach the pickup location and drop-off location and applying the walking forecast corresponding to each location; and causing presentation of a notification to the user that includes the time estimate for the user to arrive at the pickup location and the time estimate to arrive at the drop-off location.

Example 20 is a machine-storage medium for dynamically maintaining and utilizing walking profiles for time estimations in service scheduling. The machine-storage medium configures one or more processors to perform operations comprising detecting usage of an application on a user device; in response to the detecting, accessing environmental condition data at a location associated with a user of the user device, the environmental condition data comprising one or more environmental condition affecting the location; accessing walking pace data from the user device, the walking pace data representing a current walking pace of the user; correlating the walking pace data with the environmental condition data; and using the correlated data, adjusting a parameter in a walking profile of the user stored in a data storage.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

receiving a request for delivery service from a user device of a requester;

in response to receiving the request, detecting one or more environmental conditions at a location associated with the delivery service;

accessing, from a data storage, a walking profile of a service provider that is providing the delivery service, the walking profile comprising a baseline walking pace and an adjustment corresponding to each of a plurality of environmental conditions in the walking profile, the adjustment indicating a modification to the baseline walking pace based on a corresponding environmental condition;

determining, by a hardware processor, a walking forecast for the service provider by applying the detected one or more environmental conditions at the location associated with the delivery service to the walking profile;

determining a time estimate for the service provider to arrive at the location associated with the delivery service based on the walking forecast; and causing presentation of a notification that includes the time estimate.

2. The method of claim 1, wherein the location associated with the delivery service comprises a pickup location of an item to be delivered.

3. The method of claim 1, wherein the location associated with the delivery service comprises a delivery location.

4. The method of claim 1, further comprising:

detecting that a pickup time or drop-off time is approaching; and in response to the detecting, updating the time estimate based on current one or more environmental conditions at the location associated with the delivery service.

5. The method of claim 1, wherein determining the time estimate further comprises including a driving time for the service provider to arrive at the location associated with the delivery service.

6. The method of claim 1, wherein causing presentation of the notification comprises causing presentation of the time estimate along with directions.

7. The method of claim 1, wherein causing presentation of the notification comprises causing presentation of the notification to a device of the service provider.

8. The method of claim 1, wherein causing presentation of the notification comprises causing presentation of the notification to the user device of the requester.

9. A system comprising:
one or more hardware processors; and
a storage medium storing instructions that, when executed by the one or more hardware processors, cause the one or more hardware processors to perform operations comprising:
receiving a request for delivery service from a user device of a requester;
in response to receiving the request, detecting one or more environmental conditions at a location associated with the delivery service;
accessing, from a data storage, a walking profile of a service provider that is providing the delivery service, the walking profile comprising a baseline walking pace and an adjustment corresponding to each of a plurality of environmental conditions in the walking profile, the adjustment indicating a modification to the baseline walking pace based on a corresponding environmental condition;
determining a walking forecast for the service provider by applying the detected one or more environmental conditions at the location associated with the delivery service to the walking profile;
determining a time estimate for the service provider to arrive at the location associated with the delivery service based on the walking forecast; and
causing presentation of a notification that includes the time estimate.

10. The system of claim 9, wherein the location associated with the delivery service comprises a pickup location of an item to be delivered.

11. The system of claim 9, wherein the location associated with the delivery service comprises a delivery location.

12. The system of claim 9, wherein the operations further comprise:
detecting that a pickup time or drop-off time is approaching; and
in response to the detecting, updating the time estimate based on current one or more environmental conditions at the location associated with the delivery service.

13. The system of claim 9, wherein determining the time estimate further comprises including a driving time for the service provider to arrive at the location associated with the delivery service.

14. The system of claim 9, wherein causing presentation of the notification comprises causing presentation of the time estimate along with directions.

15. The system of claim 9, wherein causing presentation of the notification comprises causing presentation of the notification to a device of the service provider.

16. The system of claim 9, wherein causing presentation of the notification comprises causing presentation of the notification to the user device of the requester.

17. A machine-storage medium storing instructions that, when executed by one or more hardware processors of a machine, cause the machine to perform operations comprising:
receiving a request for delivery service from a user device of a requester;
in response to receiving the request, detecting one or more environmental conditions at a location associated with the delivery service;
accessing, from a data storage, a walking profile of a service provider that is providing the delivery service, the walking profile comprising a baseline walking pace and an adjustment corresponding to each of a plurality of environmental conditions in the walking profile, the adjustment indicating a modification to the baseline walking pace based on a corresponding environmental condition;
determining a walking forecast for the service provider by applying the detected one or more environmental conditions at the location associated with the delivery service to the walking profile;
determining a time estimate for the service provider to arrive at the location associated with the delivery service based on the walking forecast; and
causing presentation of a notification that includes the time estimate.

18. The machine-storage medium of claim 17, wherein the location associated with the delivery service comprises a pickup location of an item to be delivered or a delivery location.

* * * * *